June 12, 1962
N. E. ROTH
3,038,444
ELECTRIC COW TRAINER
Filed Aug. 5, 1959
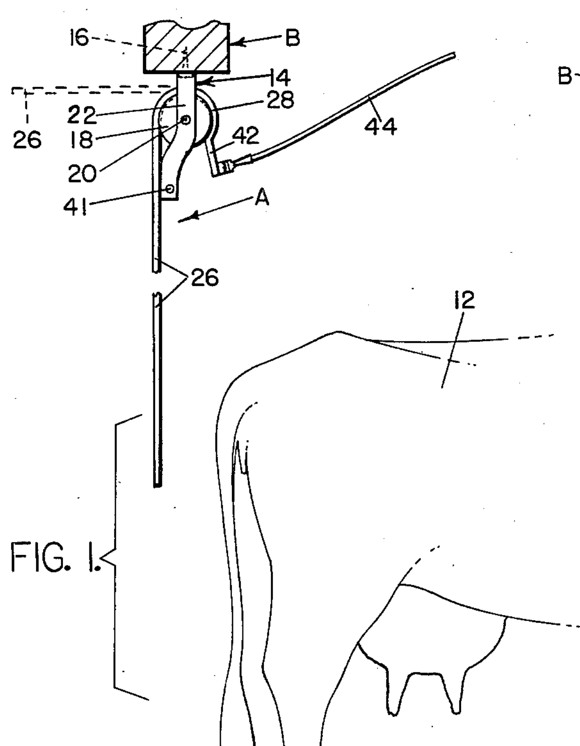
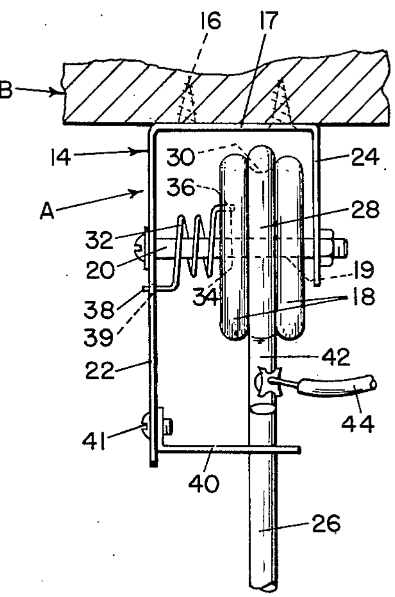
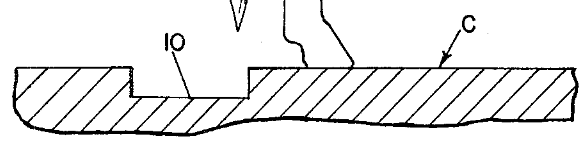
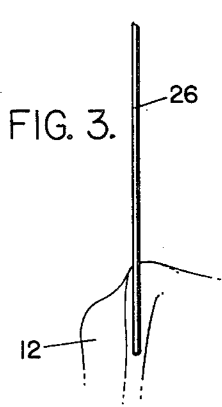
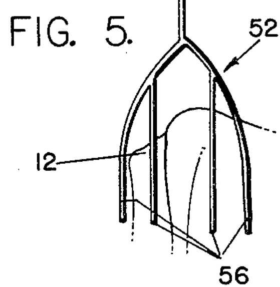
FIG. 5.
54
52
12
56
INVENTOR;
NORMAN E. ROTH.
BY Robert M. Dunning
ATTORNEY 3,038,444

ELECTRIC COW TRAINER

Norman E. Roth, Loyal, Wis.

Filed Aug. 5, 1959, Ser. No. 831,750
6 Claims. (Cl. 119—27)

The instant invention relates to improvements in animal controlling or restraining devices to be utilized in dairy barns and the like and deals particularly with an electrical device designed to automatically electrically shock a dairy cow should the animal stand with its hind feet in the usual gutter at the rear of the stall.

Devices of this general character now in use provide an electrical system which energizes a vertically adjustable contact member suspended from an electrically charged wire disposed above the stall. While such systems do in fact perform their intended functions they are far too expensive and complicated to install and to adjust considering the short time that a training device is needed. It is a well known fact that after a few instances of receiving a shock a cow will stand in the proper place within the stall.

A feature of this invention resides in the provision of a training device which can be readily swung into place behind a cow and which may be readily swung out of the way when not in use. This feature eliminates the tedious necessity of adjusting the device to fit individual animals.

Another feature of this invention resides in the provision of a training device which is extremely simple and of moderate cost and which is highly efficient resulting in the maintenance of sanitary conditions within a dairy barn.

These and other novel features and advantages will become apparent from the following specification taken in connection with the drawings wherein:

FIGURE 1 is a view in side elevation showing the device in a position of use relative to a stall and an animal.

FIGURE 2 is an enlarged frontal view of the mounting and suspension means employed in the device.

FIGURE 3 is a fragmentary perspective view showing one form of contact member.

FIGURE 4 is a view similar to FIGURE 3 showing an additional form of contact member.

FIGURE 5 is a view similar to FIGURES 3 and 4 showing a further form of a contact member.

Referring now to the drawings and particularly to FIGURE 1, the device generally indicated by the letter A is shown secured beneath the roof or rafter B of a barn above the level of a platform or stall C. The numeral 10 indicates a refuse receiving gutter which is conventionally located at the rear of the stall C and above which the device is suspended. The animal 12 normally stands in the stall so that droppings will be deposited in the gutter 10 rather than in the stall area C.

The trainer A consists of a generally U shaped support bracket 14 which is attached to the ceiling or rafters B by screws 16 extending through the base 17 of the bracket. An insulator 18 having an axial aperture 19 therethrough is rotatably mounted on the bolt 20 which extends between the sides 22 and 24 of the bracket 14.

A current conducting contact bar 26 is suspended from the insulator 18 by having the upper end 28 thereof bent to encircle and to engage the insulator in its circular groove 30. The bar 26 is biased in a normal position above the gutter by a torsion spring 32. One end 34 of the spring 32 is inserted into a depression or bore 36 in the surface of the insulator 18 which the opposite end 38 of the spring is inserted through an aperture 39 in the wall 22 of the bracket 14.

A stop member 40 which is formed of insulation material or insulated from the bracket is attached by a bolt 41 to the lower extremity of the side 22 and acts as an arrester preventing the pivotal movement of the bar 26 forwardly of a point above the gutter, and to limit swinging movement of the bar toward the cow in proper position in the stall. The bar 26 is provided with a tab or outwardly directed extension 42 to which is clamped an electric current supply wire 44 which energizes the contact bar 26. The wire 44 may be secured to overhead joists or the like in such a way as to span the stall or any additional number of stalls.

It is thought that the operation of the trainer will be apparent from the foregoing. Briefly when the cow 12 stands with all four feet on the base of the stall C the end of the bar 26 is substantially removed from contact with the rear of the animal. Droppings will thus be deposited in the refuse gutter. Should the animal back up or put its hind feet in the gutter it will come in contact with the bar 26. A mild electric shock is a very effective reminder since cows are very sensitive to an electric shock although no harmful effect will result from its use. Before the animal enters a stall or when the device is not being used the current is turned off and the bar 26 may be swung upwardly adjacent the ceiling as shown by the broken line position in FIGURE 1 and fastened there by any suitable means.

FIGURES 4 and 5 of the drawings show modified forms of the contact bar which are provided for specific purposes. The embodiment 46 illustrated in FIGURE 4 is designed for use in wider stalls and in cases where stall dividers are not provided. This construction includes a central bar 48 having a bifurcated lower end including spaced apart lines 50 which extend laterally of the stall to cover a wider area. The upper end of the bar 48 is identical to the upper end of the bar 26 and is similarly supported. The model 52 illustrated in FIGURE 5 is designed for use on animals which are a persistent problem and which move about considerably within a stall. This member 52 includes a central bar 54 which is supported similarly to the bars 26 and 48 and which is branched laterally to provide a series of spaced arms 56.

In accordance with the patent statutes, I have described the principles of construction and operation of my improvement in animal restraining device, and while I have endeavored to set forth the best embodiment thereof, I desire to have it understood that changes may be made within the scope of the following claims without departing from the spirit of my invention.

I claim:

1. An animal training device for use in a stall having a gutter rearwardly thereof, the device including a supporting bracket adapted to be mounted above the gutter, an electrically conductive member pivotally suspended from said bracket on an axis transversely of said stall, means on said bracket engageable with said member to limit pivotal movement of said member toward said stall, and a current supply means connected to said member.

2. An animal trainer for use in a stall having a gutter rearwardly of the stall and an electric supply wire above said stall, said trainer comprising a current conducting swingable elongated bar located at the rear of said stall and above said gutter having a completely bare lower end, a support bracket arranged to pivotally suspend said bar above said gutter so that said bare lower end is engageable by an animal contained in said stall, and a clamping means on said electrical current supply wire detachably clamped on said bar for energizing said bar.

3. An animal trainer for use in a stall having a gutter rearwardly of the stall and an electrical supply wire above said stall, said trainer comprising a current conducting swingable elongated bar located at the rear of said stall and arranged to normally extend downwardly towards said gutter, a substantially U shaped ceiling bracket having pivot means for pivotally suspending said bar, and means connecting said current supply wire to said bar for energizing said bar.

4. An animal training device for use in a stall having a gutter rearwardly of the stall and an electric current supply wire above said stall, said training device including a supporting bracket, pivot means having a substantially horizontal axis on said bracket, an insulator rotatable on said pivot means, an electrical current conducting bar connected to and depending from said insulator, said bar being swingable from a point at the rear of said stall and above said gutter to a point substantially removed from said stall and gutter, and means connecting said current supply wire to said bar.

5. The structure of claim 4 in which said bracket comprises a U-shaped bracket and in which said pivot means consists of a bolt extended between the sides of said U shaped supporting bracket, a torsion spring on said bolt having one end in fixed engagement with one side of said bracket, and having its other end in engagement with said insulator for normally biasing said bar into a position directly over said gutter at the rear of said stall, and stop means on said bracket projecting into the path of said bar for limiting movement of said bar toward said stall to a point directly over said gutter.

6. An animal training device for use in a stall having a gutter rearwardly of said stall and an electric current supply wire above said stall, said training device including a substantially U shaped supporting bracket, pivot means on said bracket, an insulator means rotatable on said pivot means, a current conducting bifurcated contact bar connected to and swingably suspended from said insulator member whereby said bar may be swung from a normal position directly over said gutter to a point above and to the rear of said stall.

References Cited in the file of this patent

UNITED STATES PATENTS

| | | |
|---|---|---|
| 2,605,565 | Meyer | Aug. 5, 1952 |
| 2,623,498 | Gustavsson | Dec. 30, 1952 |